United States Patent
Corn et al.

(10) Patent No.: US 11,673,463 B2
(45) Date of Patent: Jun. 13, 2023

(54) ELECTRIC MOTOR SYSTEM

(71) Applicant: Dana Heavy Vehicle Systems Group, LLC, Maumee, OH (US)

(72) Inventors: Langston H. Corn, Sylvania, OH (US); Mark A. Davis, Opelika, AL (US); Jordan M. Houser, Sylvania, OH (US); Darren J. Ziskovsky, Bowling Green, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/143,400

(22) Filed: Jan. 7, 2021

(65) Prior Publication Data

US 2022/0212528 A1 Jul. 7, 2022

(51) Int. Cl.
| | |
|---|---|
| *B60K 1/02* | (2006.01) |
| *H02K 11/40* | (2016.01) |
| *H02K 7/08* | (2006.01) |
| *F16H 1/28* | (2006.01) |
| *H02K 7/116* | (2006.01) |

(52) U.S. Cl.
CPC ............. *B60K 1/02* (2013.01); *F16H 1/28* (2013.01); *H02K 7/08* (2013.01); *H02K 7/116* (2013.01); *H02K 11/40* (2016.01); *F16H 2200/2005* (2013.01); *F16H 2200/2097* (2013.01)

(58) Field of Classification Search
CPC ..... F16H 2200/2005; F16H 2200/2097; F16H 3/727–728; B60K 1/02; H02K 7/116; B60L 50/40–50
See application file for complete search history.

(56) References Cited

U.S. PATENT DOCUMENTS

| | | | |
|---|---|---|---|
| 3,926,072 A | 12/1975 | Richardson | |
| 5,904,631 A | 5/1999 | Morisawa et al. | |
| 6,371,878 B1 | 4/2002 | Bowen | |
| 10,840,536 B2 | 11/2020 | Rogers et al. | |
| 2003/0232678 A1* | 12/2003 | Yamauchi | F16H 3/728 903/910 |
| 2007/0010364 A1* | 1/2007 | Bucknor | B60K 6/445 475/5 |
| 2013/0040773 A1* | 2/2013 | Sugino | B60K 6/48 475/5 |
| 2013/0345009 A1* | 12/2013 | Iwasa | F16H 57/021 475/5 |
| 2014/0024490 A1* | 1/2014 | Bangura | B60W 20/13 475/5 |
| 2015/0298574 A1 | 10/2015 | Bramson | |

FOREIGN PATENT DOCUMENTS

| | | | | |
|---|---|---|---|---|
| CN | 1976172 A | * | 6/2007 | ............. H02K 16/02 |
| DE | 202005020628 U1 | * | 8/2006 | ........... B60K 7/0007 |
| JP | 2012070558 A | * | 4/2012 | ............. H02K 29/08 |
| KR | 101744836 B1 | * | 6/2017 | ............... B60K 6/38 |

* cited by examiner

Primary Examiner — Ernesto A Suarez
Assistant Examiner — Lillian T Nguyen
(74) Attorney, Agent, or Firm — McCoy Russell LLP (57) ABSTRACT

Methods and systems for an electric motor system are provided. In one example, a motor system is provided which comprises a first electric machine rotationally coupled to a second electric machine by a planetary gear set that has three components: a ring gear, a sun gear, and a carrier with a plurality of planet gears. In the system, the first electric machine varies in size from the second electric machine and one of the planetary assembly components is permanently grounded.

19 Claims, 4 Drawing Sheets

ELECTRIC MOTOR SYSTEM

TECHNICAL FIELD

The present disclosure generally relates to an electric motor system. More particularly the disclosure relates to an electric motor system with two electric machines coupled to a planetary gear set.

BACKGROUND AND SUMMARY

Some electric vehicle drive arrangements have included a single electric motor designed to provide and/or augment rotational energy delivered to downstream drivetrain components. Certain operating conditions may demand the use of the electric motor outside a desired operating efficiency, which causes powertrain efficiency to drop.

US 2015/0298574 A1 to Bramson teaches a hybrid drive arrangement where two motors are coupled in parallel to a gear set in an attempt to increase system efficiency. In one embodiment, Bramson utilizes a planetary gear set in which two gears serve as an input and a third gear serves as an output. Bramson's planetary arrangement selectively divides the torque transferred between the motors and the drive wheels.

The inventors have recognized several drawbacks with Bramson's electric vehicle drive arrangement and other electric motor arrangements. For instance, Bramson's system may be more susceptible to degradation due to the system's adjustable output speed ratio. Furthermore, Bramson's planetary gear set may exhibit space inefficiencies that result from all of the gears in the planetary arrangement functioning as either a rotational input or output during operation.

To overcome at least some of the aforementioned challenges, a motor system is provided. The electric motor assembly, in one example, includes a first electric machine rotationally coupled to a second electric machine via a planetary gear set. The planetary gear set comprises three components: a ring gear; a sun gear; and a carrier on which a plurality of planet gears resides. In the system, the first electric machine varies in size from the second electric machine. Further in the system, one of the three components is permanently grounded. In this way, electric machines of varying size are combined in a space efficient package. Permanently grounding one of the gears while permitting rotation of the other gears, allows the electric machines to be operated synchronously at different speeds via a fixed ratio reduction. Consequently, the motors may have variances with regard to power output and size, which may decrease system cost and complexity while achieving target performance characteristics (e.g., power and efficiency targets).

In another example, the ring gear may be permanently grounded and the sun gear may be rotationally coupled to the first electric machine. Further, in such an example, the ring gear may be rotationally coupled to the second electric machine. Consequently, the system may exhibit a fixed gear ratio which allows the differently sized motors to be combined and efficiently operated, if wanted. As a result, the system may achieve performance gains. The system may further avoid machine speed constraints demanded in motor arrangements where multiple motors with different operational speed ranges directly attach to one another.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 6 is drawn approximately to scale. However, other relative component dimensions may be used, in other embodiments.

DETAILED DESCRIPTION

A motor system space efficiently combining a pair of electric motors with a planetary gear reduction which provides motor performance synchronization, is described herein. In the system, the pair of electric motors is coupled via a planetary gear set which may have a set ratio. This planetary arrangement allows motors with varying operational speed ranges to be combined and efficiently operated, if so desired. To achieve the space efficient layout, the planetary gear set and, in some instances, one of the motors, may be at least partially radially nested within the other motor. In the planetary arrangement, the carrier may be grounded, while the sun gear functions as a first motor input, and the ring gear serves a dual use as a second motor input and the motor system's output. Arranging the planetary gear set's inputs and output in this manner achieves a desired gear ratio, which may be fixed, in some embodiments. In this way, the motor outputs are compactly combined via the planetary gear ratio while motor performance of the different motors can be strategically blended to meet design goals. Furthermore, the motor performance gains may be realized in a package which may be smaller, lighter, and/or less susceptible to degradation than gear sets with an adjustable output speed ratio. The system may therefore achieve a more robust design with greater applicability and customer appeal.

Figure 1:
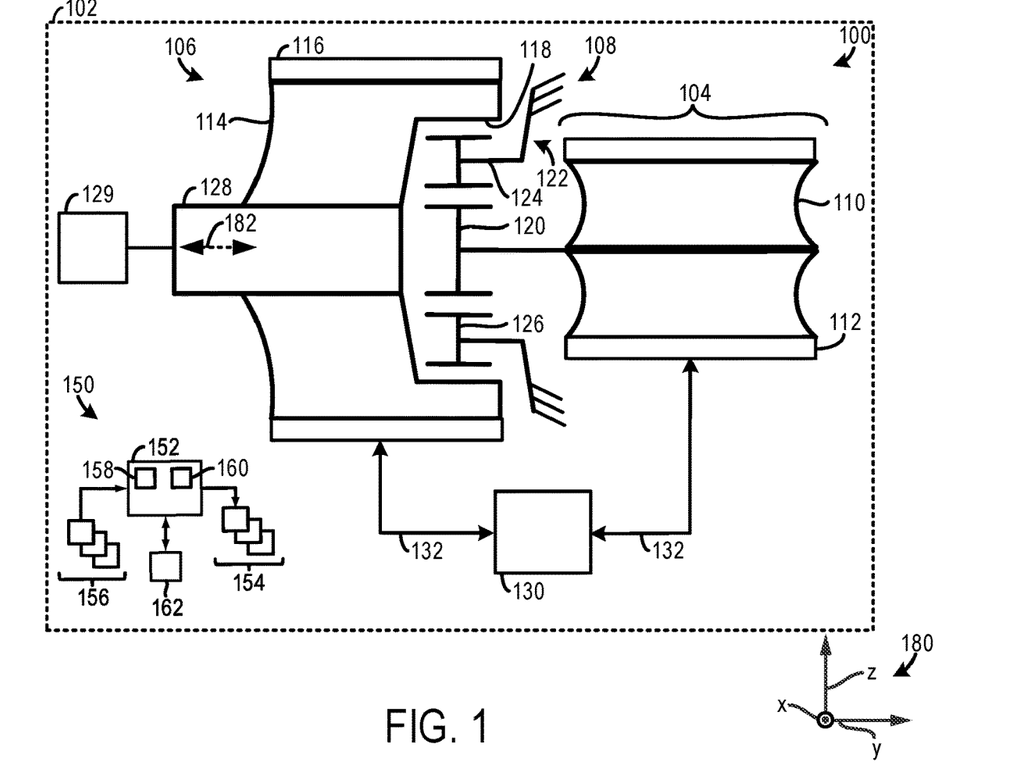
FIG. 1 shows a schematic representation of a first embodiment of a motor system.
Figure 2:
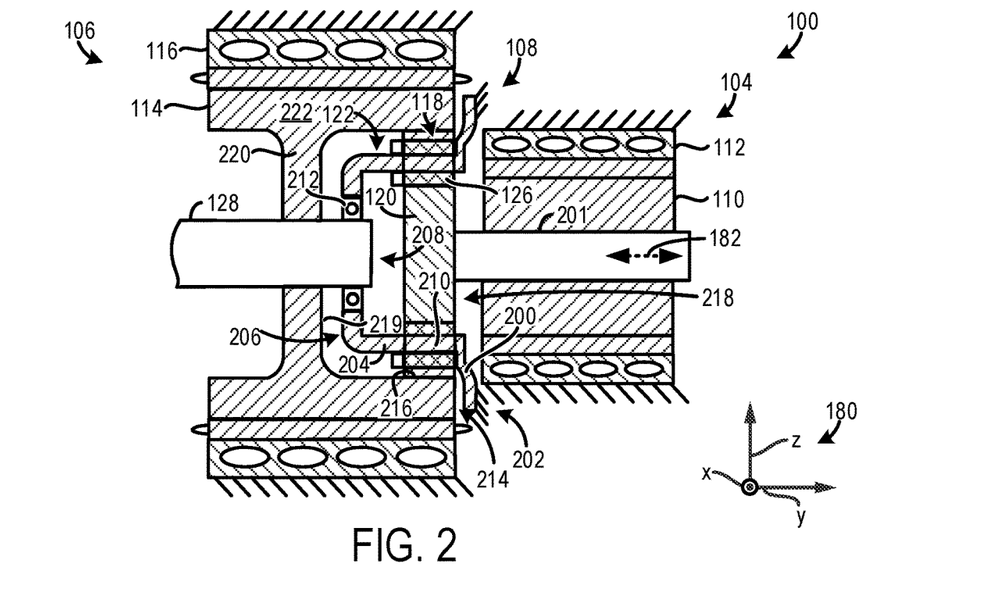
FIG. 2 shows a detailed illustration of the first embodiment of the motor system, depicted in FIG. 1.
Figure 3:
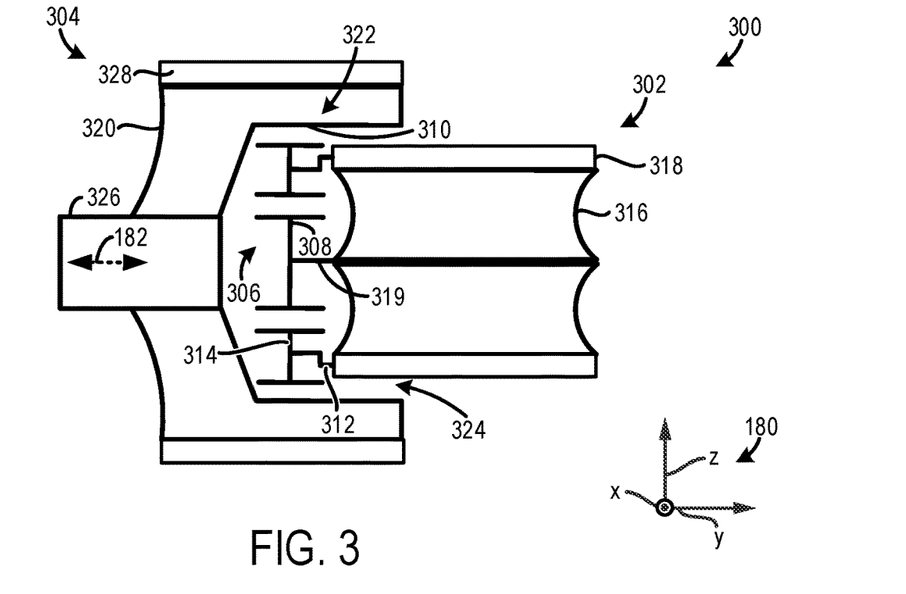
FIG. 3 shows a schematic representation of a second embodiment of a motor system.
Figure 4:
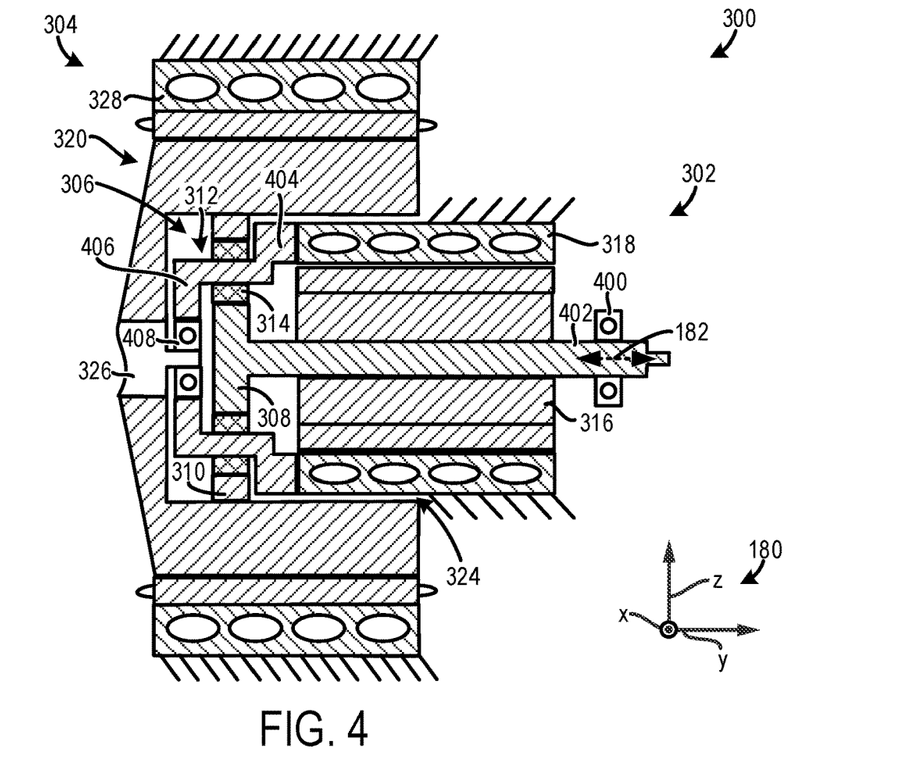
FIG. 4 shows a detailed illustration of the second embodiment of the motor system, depicted in FIG. 3.
Figure 5:
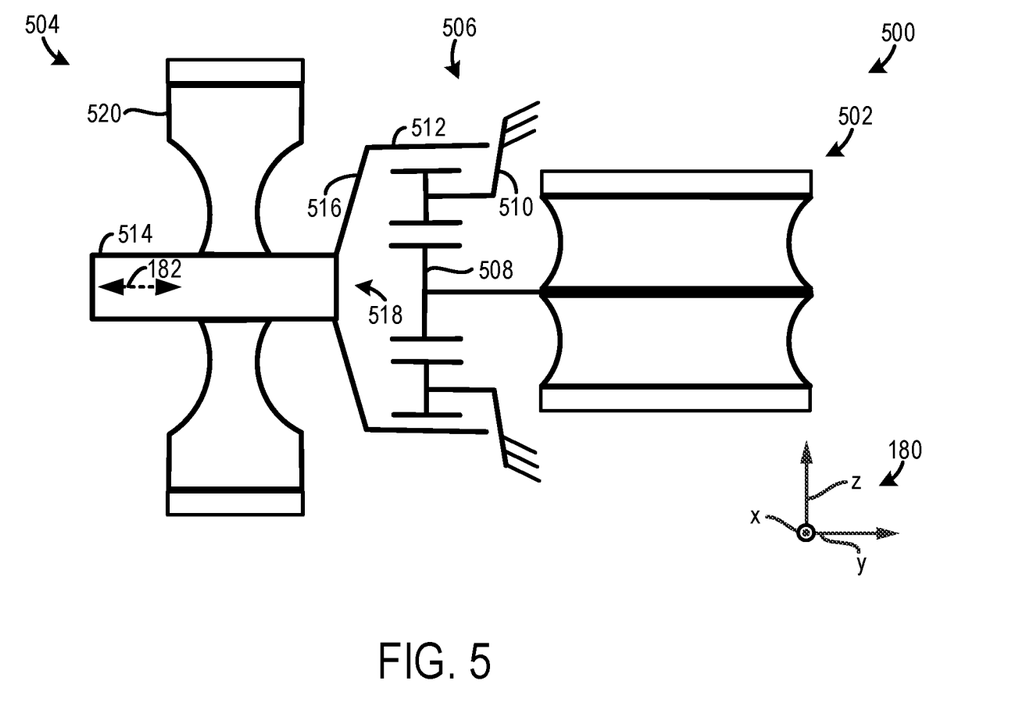
FIG. 5 shows a schematic representation of a third embodiment of a motor system.
Figure 6:
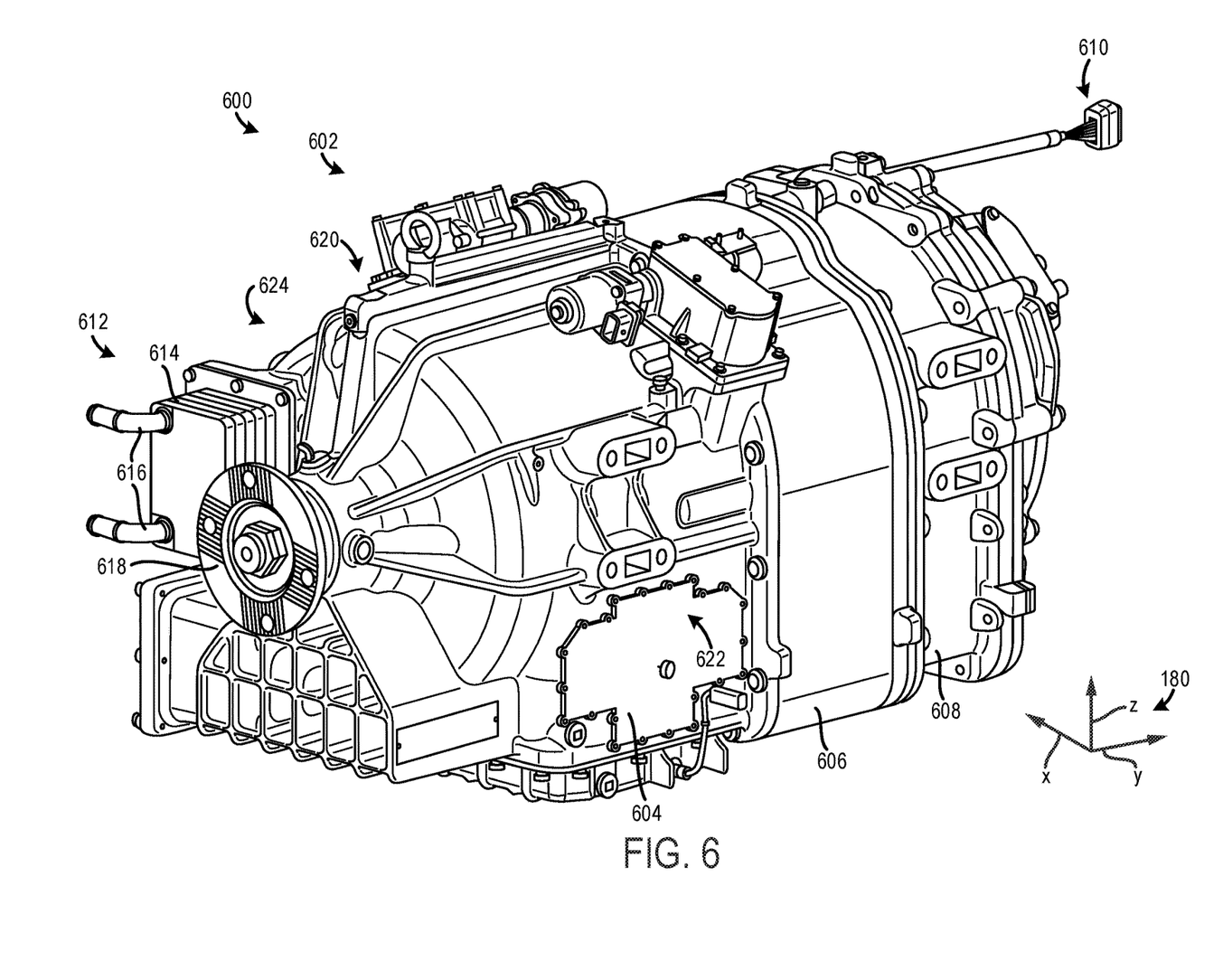
FIG. 6 shows an illustration of a use-case example of a motor system.

FIGS. 1 and 2 depict a first embodiment of a motor system with two electric machines of different sizes which are synchronously combined using a planetary gear set. FIGS. 3-4 illustrate a second embodiment of a motor system where a rotor of one of the motors functions as the ring gear of the planetary assembly to increase system space efficiency. FIG. 5 depicts a third embodiment of a motor system with multiple electric machines compactly combined via a planetary gear set. FIG. 6 depicts a use-case example of a motor system housing which space efficiently packages the electric machines and planetary assembly.

FIG. 1 shows a first embodiment of a motor system 100. The motor system 100 may be included in a vehicle 102, in one example. In such an example, the vehicle 102 may be a light, medium, or heavy duty vehicle. Said vehicle may be an electric vehicle such as a battery electric vehicle (BEV)

or a hybrid electric vehicle. In the hybrid vehicle example, both the motor system and an internal combustion engine may be used to generate motive power while in the BEV example the internal combustion engine may be omitted. A BEV may have a less complex powertrain configuration which may drive down the chance of powertrain degradation, in certain cases. The motor system 100 may, in some instances, be utilized in other fields which may benefit from a relatively space efficient motor arrangement with increased performance characteristics. For example, the motor system may be deployed in industrial equipment, agricultural equipment, aerospace equipment, etc. The other motor system described herein may likewise be included in a vehicle or the aforementioned end-use applications.

The motor system 100 includes a first electric machine 104 and a second electric machine 106 coupled to a planetary gear set 108. The first and second electric machines 104, 106 may be motors, motor-generators, or combinations thereof, for instance. Further, the electric machines vary in size and therefore may have different operating speed ranges. For example, the first electric machine 104 may be a higher speed motor with an operational speed range between 0 and 16,500 revolutions per minute (RPM) and the second electric machine 106 may be a lower speed motor with an operational speed range between 0 and 4,500 RPM, in some cases. Nevertheless, different speed range variants lie within the scope of the present disclosure. The motor speed ranges may be selected based on the desired operating speeds of downstream components, transmission gear ratios in end-use applications with adjustable gear reductions, and/or expected end-use environment operating conditions.

The first electric machine 104 includes a rotor 110 and a stator 112 which, during use, electromagnetically interact to generate rotational output and, in the motor-generator example, generate electrical energy, during generator operation. Likewise, the second electric machine 106 includes a rotor 114 and a stator 116 functioning in a similar manner. The rotors and stators in the machines may include components such as stator windings, rotor laminations, rotor windings, magnets, electrical interfaces, etc. to achieve the abovementioned functionality.

A variety of suitable electric motor configurations may be used depending on the end-use design goals. For instance, alternating current (AC) motors have been envisioned. AC motors may be used due to their higher energy conversion efficiency, higher power density, greater reliability, and less maintenance which may at least partially stem from the reduction (e.g., avoidance) of mechanical wear between the stator and rotor, and regenerative braking efficacy in comparison to direct current (DC) motors. Although, DC motor variants may be used in some scenarios. AC motor types include asynchronous (e.g., squirrel cage and wound rotor) and synchronous style motors. Synchronous motors, such as three, six, or nine phase, may be used in certain embodiments. The styles of multiphase motors that may be deployed include permanent magnet, synchronous reluctance, synchronous induction, and hysteresis. In one use-case example, a permanent magnet or other suitable synchronous AC motor may be utilized, due to its high conversion efficiency. However, in other instances, an induction AC motor may be used due to its lower component cost in comparison to permanent magnet motors that utilize costlier rare earth metals.

The first and second electric machines 104, 106 are rotationally coupled via the planetary gear set 108. Three components are included in the planetary gear set: a ring gear 118, a sun gear 120, a carrier 122 with planet gear shafts 124 on which a plurality of planet gears 126 reside and rotate during operation. It will be appreciated that the sun gear, the ring gear, and the planet gears may each include teeth meshing with the gears to which they are attached.

In the motor system 100, one of the three planetary gear set components is grounded. Specifically, in the illustrated embodiment, the carrier 122 is permanently grounded. Conversely, the other components (planet gears, sun gear, and ring gears) in the gear set are permitted to rotate. Mechanically grounding the carrier while allowing the other components in the planetary gear set to rotate enables the gear set to achieve a targeted gear ratio. The rotational configuration (grounded or in-rotation) of the planetary gear set components may remain fixed during system operation, in some embodiments. In this way, the system's complexity may be reduced, thereby reducing the likelihood of component degradation.

The system's housing may be used to accomplish said grounding, although other suitable grounding components may be utilized, in alternate embodiments. Using the housing for planetary grounding may increase system packaging efficiency and decrease system weight when compared to systems using a separate component for grounding.

Grounding the carrier via the housing allows the planetary assembly to provide a desired gear reduction in a space efficient package. Further, in the illustrated embodiment, the sun gear 120 functions as a first input for the planetary gear set 108, during drive operation. Further during drive operation, the ring gear 118 functions as a second input for the planetary gear set 108 and an output of the gear set. Thus, the ring gear 118 may be coupled to or formed integrally with an output shaft 128. It will be appreciated that, during a regenerative mode, the planetary gear set's inputs and output may be conceptually reversed. Thus, more generally, the sun gear 120 may be rotationally coupled (e.g., directly rotationally coupled) to the first electric machine 104, the ring gear 118 may be rotationally coupled (e.g., directly rotationally coupled) to the second electric machine 106 and the output shaft 128. In this way, rotational inputs of varying speeds from differently sized motors may be synchronously combined by the planetary gear set with a fixed gear reduction to deliver torque to downstream components.

As shown in FIG. 1, the ring gear 118 and the rotor 114 may form a continuous structure. Consequently, the compactness of the system may be increased and installation of the planetary gear set may be simplified, in some cases. However, embodiments in which the ring gear and rotor are separately formed and mechanically coupled have been contemplated.

Designing the ring gear as both a planetary input and output allows system space efficiency to be further increased. The output shaft 128, coupled to the rotor 114 and the ring gear 118 axially extends away from the planetary gear set 108. In this way, the output shaft may be routed through the interior of the system. The output shaft 128 may be rotationally coupled to downstream components such as a driveline, a transmission, a differential, or other suitable drivetrain component, in the electric vehicle embodiment. However, downstream components in other fields with rotational input needs have been contemplated. The downstream component is schematically depicted at 129.

When the sun and the ring gears 120, 118, respectively, are used as electric machine inputs, the machines may be rotated in opposite directions to allow the motor torque to be synchronously combined via the planetary gear set. To elaborate, during operation (e.g., forward or reverse drive operation) the first electric machine's output shaft may be spun in a first rotational direction and the second electric machine's output shaft may be spun in a second rotational direction, opposite the first.

As illustrated, the ring gear 118 may be formed with the rotor 114 of the second electric machine 106. In this way, the space efficiency of the planetary arrangement may be increased. However, arrangements where the ring gear 118 and rotor 114 form two distinct structures have been envisioned.

In the illustrated embodiment, the first electric machine 104, the second electric machine 106, and the planetary gear set 108 are arranged coaxial to one another. This coaxial arrangement, further increases motor system compactness when compared to systems with axially offset motor arrangements. The system's applicability may be expanded as a result of the increased compactness, thereby increasing customer appeal. In other embodiments, however, the first electric machine 104, the second electric machine 106, and/or the planetary gear set 108 may not be coaxially arranged.

The motor system 100 may further include a control system 150 with a controller 152, actuators 154, and sensors 156. The controller 152 include memory 158 holding instructions executable via a processor 160 to carry out the control techniques described herein. The processor 160 may include a microprocessor unit and/or other types of circuits. The memory 158 may include known data storage mediums such as random access memory, read only memory, keep alive memory, combinations thereof, etc. The control system 150 may further include one or more input devices 162 such as an accelerator pedal in the vehicle embodiment, graphical user interface (GUI), knobs, switches, sliders, and the like which enable a system operator to adjust the system's rotational output and motor speeds and/or torque, in particular. It will be understood, the motor speeds may additionally or alternatively be programmatically controlled based on operating conditions of the system or the end-use environment in which the system resides.

The controller 152 may send control signals to the actuators 154 positioned at different locations in the motor system. For instance, the controller 152 may send signals to actuators in the first electric machine 104 to alter the rotational output of the electric machine based on system operating conditions. Thus, the other controllable components in the motor system may similarly function with regard to command signals and actuator adjustment.

One or more energy storage devices 130 (e.g., battery, capacitor, and the like) may be in electric communication with the first electric machine 104 and the second electric machine 106. Arrows 132 denote the energy transfer between the energy storage device 130 and the electric machines 104, 106. In the electric vehicle example, during a drive mode, energy may be transferred to the electric machines 104, 106 from the energy storage device(s). Continuing with the electric vehicle example, during a regenerative mode, energy may be transferred from the electric machines to the energy storage device(s). It will be appreciated that the other electric machines described herein may be electrically coupled to a similar energy storage device.

To elaborate, the controller 152 may send command signals to the first and second electric machines 104, 106 to operate the machines at selected speeds based on operating conditions. Due to the disproportionate sizing of the electric machines and the fixed gear ratio in the planetary assembly, the motors may be operated at a fixed speed ratio. The motors may therefore have a variance in power output and size, enabling the system's cost and profile to be reduced, if wanted, while achieving desired motor performance targets (e.g., power and efficiency targets).

An axis system 180 is provided in FIG. 1 as well as FIGS. 2-6, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. A rotational axis 182 of the system 100 is further provided in FIG. 1 and FIGS. 2-6, for reference. It will be understood, that the electric machines and planetary gear set share a common rotational axis when they are coaxially aligned.

FIG. 2 shows a detailed cross-sectional illustration of the motor system 100. The first electric machine 104, the second electric machine 106, and the planetary gear set 108 are again shown. The stator 112 and the rotor 110 of the first electric machine 104 as well as the stator 116 and the rotor 114 and the second electric machine 106 are further depicted. Additionally, the sun gear 120, the carrier 122 with planet gears 126, and the ring gear 118 of the planetary gear set 108 are again illustrated along with the output shaft 128 of the system. A shaft 201 rotationally attaching the rotor 110 of the first electric machine 104 to the sun gear 120 may further be included in the system.

Various components of the system may be grounded such as the stators 112, 116 of the first electric machine 104 and the second electric machine 106 as well as the carrier 122 of the planetary gear set 108. As described herein, a component is grounded when it is held stationary (in the frame of reference of the system). Thus, the grounding of the planetary gear set components described herein refers to mechanical grounding of said components.

A housing of the system, described in greater detail herein, may be used to ground the aforementioned components. The carrier 122 may specifically comprise a first section 200 on a first axial side 202 of the planetary gear set 108 which is grounded. The carrier 122 may further include a second section 204 on a second axial side 206 of the planetary gear set. The second section 204 may first axially extend away from the sun gear and then may extend radially inward toward the output shaft 128, which enables an axial end 208 of the output shaft to be offset from the sun gear. A middle section 210 of the carrier 122 may be coupled to the planet gears 126. It will be understood that bearings are arranged between the planet gears and the middle carrier section to allow the planet gears to rotate thereon.

A bearing 212 may reside between the output shaft 128 and the second section of the carrier. In this way, the output shaft 128 may be supported by a bearing which is attached to a grounded planetary component (the carrier), which even further increases system space efficiency, if so desired. The bearing 212, as well as the other bearings described herein, may include rolling elements (e.g., cylindrical rollers, balls, tapered rollers, and the like), inner races, outer races, etc. to support and allow for rotation of the components to which they are attached. Thrust and radial type bearings may be deployed and the selection of the specific type of bearing used in the system may be based on expected component loading in the system, packaging targets, etc.

The first electric machine 104 is axially offset from the second electric machine 106, in the embodiment illustrated in FIG. 2. However, other electric motor arrangements have been envisioned. Further, as illustrated in FIG. 2, at least a portion of the planetary gear set 108 is positioned radially within the rotor 114 of the second electric machine 106. Specifically, the ring gear 118, the planet gears 126, the sun gear 120, and a portion of the carrier are circumferentially surrounded by a section of the rotor 114. This rotor section is coupled to or has the ring gear integrally formed therein. To elaborate, an axial side 214 of the rotor 114 includes an interior surface 216 profiled with teeth to mate with teeth in the planet gears 126 on the carrier 122. Thus, the ring gear 118 and rotor 114 may at least partially circumferentially enclose the planet gears 126 and the sun gear 120.

To accommodate for this planetary gear set arrangement, the second electric machine 106 may include a recess 218 sized and profiled to receive the planetary components. The boundary of the recess 218 may be an interior surface 216 of the rotor and an interior wall 219 of the rotor 114. In one example, the hub of the rotor 114, which may have laminations mated thereto, would be profiled with a cut-out to accommodate for integration of the planetary gear set therein. Arranging the system's components in this nested configuration may further increase the system's space efficiency, if so desired, which may again increase the system's applicability and customer appeal.

The rotor 114 may include an inner extension 220 coupled to the output shaft 128. Thus, the inner extension 220 radially extends from a body 222 of the rotor 114 to the output shaft 128. Thus, the rotor 114, ring gear 118, and output shaft 128 may be fixedly rotationally coupled to one another and, in certain examples, integrally formed together. The bearing 212 may be interposed between the inner extension 220 and the sun gear 120 to achieve targeted output shaft support characteristics.

FIG. 3 depicts a stick diagram of a second embodiment of a motor system 300. The motor system 300 again includes a first electric machine 302 and a second electric machine 304 whose outputs are cooperatively combined via a planetary gear set 306. The planetary gear set 306 again comprises a sun gear 308, a ring gear 310, and a carrier 312 with multiple planet gears 314 rotatably coupled thereto. The first electric machine 302 again includes a rotor 316, a stator 318, and an output shaft 319 coupled to the sun gear 308. These components in the motor system 300 which overlap with the components in the motor system 300 shown in FIGS. 1-2 may share common structural and/or functional characteristics. Redundant description is therefore omitted for brevity.

A rotor 320 of the second electric machine 304 includes a section 322 structured as the ring gear of the planetary gear set 306. In this way, a portion of the rotor 320 of the second electric machine 304 may at least partially circumferentially enclose the planet gears 314, the sun gear 308, and the carrier 312, similar to the motor system 100 shown in FIGS. 1-2. In the motor system 300, a recess 324 is sized/profiled to accommodate for both the planetary gear set 306 and a portion of the rotor 316 of the first electric machine 302. In this way, the system's compactness is even further increased.

In the second system embodiment, the carrier 312 is again grounded. However, as illustrated in FIG. 3, the carrier 312 is coupled to a stator 318 of the first electric machine 302 which is grounded. In this way, the carrier 312 and stator 318 may be cooperatively grounded. The system 300 again comprises an output shaft 326 coupled to the rotor 320 which is enclosed within a stator 328 of the second electric machine 304.

FIG. 4 depicts a detailed illustration of the second embodiment of the motor system 300. The first electric machine 302, the second electric machine 304, and the planetary gear set 306 are again illustrated. The sun gear 308, the ring gear 310, and the carrier 312 on which the planet gears 314 rotate, are further depicted. The stator 318 of the first electric machine 302 and the stator 328 of the second electric machine 304 may be grounded by a housing or other suitable gear system component.

The motor system 300 may comprise a bearing 400 coupled to and supporting a shaft 402 of the first electric machine 302. As illustrated, the shaft 402 forms a continuous (e.g., monolithic) structure with the sun gear 308. Nonetheless, system designs with a separately formed output shaft and sun gear have been contemplated. For instance, the output shaft and sun gear may be separately manufactured and coupled via a welded interface, splines, attachment devices, combinations thereof, etc.

In the second embodiment, the extended rotor recess 324 of the second electric machine 304 allows the rotor 320 to circumferentially surround the planetary gear set 306 and a portion of the first electric machine 302. To elaborate, the rotor 320 circumferentially surrounds a section of the rotor 316 and the stator 318 of the first electric machine 302. Consequently, the profile of the overall system package may be even further reduced.

The carrier 312 shown in FIG. 4 includes, on a first axial side, a first section 404 coupled to the stator 318 of the first electric machine 302. On the second axial side, a second section 406 of the carrier 312 is coupled to a bearing 408. The bearing 408 is also coupled to the output shaft 326 of the motor system 300. In this way, the carrier may react bearing loads.

FIG. 5 illustrates a third embodiment of a motor system 500 which again includes a first electric machine 502 and a second electric machine 504 coupled to a planetary gear set 506. The planetary gear set 506 includes a sun gear 508 which functions as input for the first electric machine, a carrier 510 which is grounded, and a ring gear 512 which operates as both an input for the second electric machine and a system output. Repeated description of the components sharing similar structural and/or functional features with the previously described motor system components is omitted for concision.

FIG. 5 shows the ring gear 512 coupled to an output shaft 514 via a ring gear extension 516. The ring gear extension 516 radially projects from an interior end 518 of the output shaft 514 and is further axially offset from a rotor 520 of the second electric machine 504. Thus, as shown, the first electric machine 502, the planetary gear set 506, and the second electric machine 504 are axially offset from one another. The likelihood of electromagnetic interference between the motors may consequently be reduced at the expense of system compactness, when compared to the motor system embodiments depicted in FIGS. 1-4.

FIG. 6 depicts a use-case example of a motor system 600. It will be appreciated, that the motor system 600 may exhibit any of the aforementioned structural and/or function features of the motor systems discussed above with regard to FIGS. 1-5 or vice versa. Thus, the motor system may include two electric machines coupled via a planetary gear arrangement.

In the illustrated example, the motor system 600 comprises a housing 602 with a first section 604, a second section 606, and a third section 608. In one example, the first section 604 may enclose the drivetrain that is driven by the motor system. Further, section 606 may house the second electric machine which is connected to the ring gear of the planetary arrangement. Additionally, section 608 may house the first electric machine which drives the sun gear of the planetary gear set. In the illustrated example, section 606 may enclose the planetary gear set. Alternatively, a housing section between sections 606 and 608 may enclose the planetary gear set. As shown, the housing sections are mechanically coupled to one another via flanges and attachment devices (e.g., bolts, pins, screws, and the like) that extend therethrough. In this way, the housing sections may be removably attached to allow the interior components to be efficiently accessed during repair, for instance. Nevertheless, more permanent housing attachment techniques, such as welding, have been contemplated.

Electrical interface 610 may extend from the housing 602. The electrical interface may provide electronic communication for motor control and sensor signals. In some examples, higher voltage electric interfaces may additionally be provided in the housing to allow for electric energy transfer between the first and second electric machines and one or more energy storage devices.

A cooling assembly 612 may be included in the motor system 600. In one example, the cooling assembly 612 may route coolant internally via conduits through the transmission, gearbox, and/or motor assembly. Further, in the illustrated example, the cooling assembly 612 includes a heat exchanger 614. In such an embodiment, the cooling assembly may be an oil cooled assembly. Alternatively, the cooling system may use a water cooling arrangement in which coolant inlets and outlets may be provided for each motor to cool the motors either in a series or parallel configuration. Thus, the working fluid in the cooling assembly may be either oil or a mixture of water and ethylene glycol, in different embodiments.

The cooling assembly 612 may further comprise input and output conduits 616 which serve as an interface for coolant circulation. The cooling assembly interface is radially offset from the system's output interface 618. This arrangement allows the packaging efficiency of the system to be increased. Other suitable locations for the cooling assembly interface have been envisioned, such as on a top side 620 of the housing or on the lateral sides 622, 624 of the housing.

The systems and methods described herein have the technical effect of increasing motor performance and system space efficiency. Consequently, the system may have broad applicability to a variety of operating environments, thereby increasing customer appeal.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements coaxial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. As used herein, the term "approximately" is construed to mean plus or minus five percent or less of the range or value unless otherwise specified.

The invention will be further described in the following paragraphs. In one aspect, a motor system is provided which comprises a first electric machine rotationally coupled to a second electric machine by a planetary gear set that comprises three components, wherein the three components include a ring gear, a sun gear, and a carrier with a plurality of planet gears rotatably coupled thereto; wherein the first electric machine varies in size from the second electric machine; and wherein one of the three components is permanently grounded.

In another aspect, an electric vehicle motor system is provided which comprises a first electric machine rotationally coupled to a second electric machine by a planetary gear set that comprises three components, wherein the three components include a ring gear, a sun gear, and a carrier with a plurality of planet gears rotatably coupled thereto; wherein the first electric machine varies in size from the second electric machine; wherein one of the three components is rotationally coupled to the second electric machine and is rotationally coupled to an output shaft; and wherein the planetary gear set has a fixed gear ratio with respect to inputs of the planetary gear set.

In yet another aspect, an electric vehicle motor system is provided which comprises a first electric machine rotationally coupled to a second electric machine by a planetary gear set that includes a ring gear, a sun gear, and a carrier with a plurality of rotatable planetary gears; wherein the first electric machine varies in size from the second electric machine; wherein the ring gear is grounded; wherein the ring gear is directly rotationally coupled to the second electric machine and is directly coupled to an output shaft; and wherein the sun gear is directly rotationally coupled to the first electric machine.

In any of the aspects or combinations of the aspects, one of the three components may be configured to receive rotational input from the first electric machine and one of the three components may be configured to receive rotational input from the second electric machine and is rotationally coupled to a motor system output.

In any of the aspects or combinations of the aspects, the carrier may be permanently grounded, the sun gear may receive rotational input from the first electric machine, and the ring gear may receive rotational input from the second electric machine.

In any of the aspects or combinations of the aspects, the first electric machine may be arranged coaxially with the second electric machine.

In any of the aspects or combinations of the aspects, a stator of the first electric machine may be at least partially circumferentially surrounded by a rotor of the second electric machine.

In any of the aspects or combinations of the aspects, the planetary gear set may be at least partially circumferentially surrounded by a rotor of the second electric machine.

In any of the aspects or combinations of the aspects, the motor system may further comprise a controller including instructions stored in non-transitory memory executable by a processor that, during motor system operation, cause the controller to: operate the first electric machine at a higher speed than the second electric machine.

In any of the aspects or combinations of the aspects, the first electric machine may have a larger operating speed range than an operating speed range of the second electric machine.

In any of the aspects or combinations of the aspects, a rotor of the second electric machine and the ring gear may form a continuous structure.

In any of the aspects or combinations of the aspects, the motor system may further comprise a bearing coupled to an output shaft and a section of the carrier.

In any of the aspects or combinations of the aspects, the planetary gear set component rotationally coupled to the second electric machine may be the ring gear.

In any of the aspects or combinations of the aspects, the carrier may be grounded.

In any of the aspects or combinations of the aspects, the sun gear may be rotationally coupled to the first electric machine.

In any of the aspects or combinations of the aspects, the first electric machine may be arranged coaxially with the second electric machine and a stator of the first electric machine may be at least partially circumferentially surrounded by a rotor of the second electric machine.

In any of the aspects or combinations of the aspects, the planetary gear set may be at least partially circumferentially surrounded by a rotor of the second electric machine and the rotor of the second electric machine and the ring gear may form a continuous structure.

In any of the aspects or combinations of the aspects, the motor system may further comprise a bearing coupled to the output shaft and a section of the carrier and wherein the output shaft is coupled to a drivetrain component.

In any of the aspects or combinations of the aspects, the first electric machine, the second electric machine, and the planetary gear set may be enclosed within a housing assembly.

In any of the aspects or combinations of the aspects, the motor system may further comprise a controller including instructions stored in non-transitory memory executable by a processor that cause the controller to: vary speeds of the first and second electric machines based on one or more system operating conditions while maintaining the first electric machine at a higher speed than the second electric machine.

In another representation, a battery electric vehicle motor system is provided which comprises a first motor directly rotationally coupled to a sun gear of a fixed ratio planetary gear assembly and a second motor directly rotationally coupled to a ring gear of the fixed planetary gear assembly and a carrier fixedly coupled to a component of the battery electric vehicle motor system to ground the carrier and prevent rotation thereof.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various motor system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies. As such, various commands, operations, and/or actions described herein may be performed in the sequence illustrated, in tandem, or in some cases omitted. Likewise, the order of processing is provided for ease of description and is not necessarily required to achieve the features and advantages of the examples described herein. One or more of the actions, operations, and/or functions, described herein may be repeatedly performed depending on the particular strategy being used. Further, the described actions, operations, and/or functions may graphically represent code to be programmed into non-transitory memory of the computer readable storage medium in the motor control system (e.g., vehicle control system), where the described actions are carried out by executing the instructions in a system including the various hardware components in combination with the electronic controller.

It will be appreciated that the configurations and routines disclosed herein are exemplary in nature, and that these specific examples are not to be considered in a limiting sense, because numerous variations are possible. For example, the above technology may be applied to motor systems with different configurations and in a vehicle with a variety of propulsion sources such as motors, engines, combinations thereof, etc. Moreover, the terms "first," "second," "third," and the like are not intended to denote any order, position, quantity, or importance, but rather are used merely as labels to distinguish one element from another, unless explicitly stated to the contrary. The subject matter of the present disclosure includes all novel and non-obvious combinations and sub-combinations of the various systems and configurations, and other functions, features, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither excluding nor requiring two or more such elements. Other combinations and sub-combinations of the disclosed features, functions, elements, and/or properties may be claimed through amendment of the present claims or through presentation of new claims in this or a related application. Such claims, whether narrower, broader, equal, or different in scope to the original claims, also are regarded as included within the subject matter of the present disclosure.

The invention claimed is:

1. A motor system, comprising:
a first electric machine rotationally coupled to a second electric machine by a planetary gear set that comprises three components, a recess formed into a rotor of the second electric machine circumferentially surrounding a portion of the first electric machine, the portion less than an entirety of the first electric machine, wherein the three components are positioned in the recess formed into the rotor of the second electric machine, the three components including a ring gear, a sun gear, and a carrier with a plurality of planet gears rotatably coupled thereto;

wherein the first electric machine varies in size from the second electric machine; and wherein one of the three components is permanently grounded.

2. The motor system of claim 1, wherein one of the three components is configured to receive rotational input from the first electric machine and one of the three components is configured to receive rotational input from the second electric machine and is rotationally coupled to a motor system output.

3. The motor system of claim 2, wherein the carrier is permanently grounded, the sun gear receives rotational input from the first electric machine, and the ring gear receives rotational input from the second electric machine.

4. The motor system of claim 1, wherein the first electric machine is arranged coaxially with the second electric machine.

5. The motor system of claim 4, wherein a stator of the first electric machine is at least partially positioned within the recess formed into the rotor of the second electric machine such that the stator of the first electric machine is at least partially circumferentially surrounded by the rotor of the second electric machine.

6. The motor system of claim 1, further comprising a controller including instructions stored in non-transitory memory executable by a processor that, during motor system operation, cause the controller to:
operate the first electric machine at a higher speed than the second electric machine.

7. The motor system of claim 1, wherein the first electric machine has a larger operating speed range than an operating speed range of the second electric machine.

8. The motor system of claim 1, wherein the rotor of the second electric machine and the ring gear form a continuous structure.

9. The motor system of claim 1, further comprising a bearing coupled to an output shaft and a section of the carrier.

10. An electric vehicle motor system, comprising:
a first electric machine rotationally coupled to a second electric machine by a planetary gear set that comprises three components, a recess formed into a rotor of the second electric machine circumferentially surrounding a portion of the first electric machine, the portion less than an entirety of the first electric machine, wherein the three components include are positioned in the recess formed into the rotor of the second electric machine, the three components including a ring gear, a sun gear, and a carrier with a plurality of planet gears rotatably coupled thereto;
wherein the first electric machine varies in size from the second electric machine;
wherein one of the three components is rotationally coupled to the second electric machine and is rotationally coupled to an output shaft; and wherein the planetary gear set has a fixed gear ratio with respect to inputs of the planetary gear set.

11. The electric vehicle motor system of claim 10, wherein the planetary gear set component rotationally coupled to the second electric machine is the ring gear.

12. The electric vehicle motor system of claim 11, wherein the carrier is grounded.

13. The electric vehicle motor system of claim 12, wherein the sun gear is rotationally coupled to the first electric machine.

14. The electric vehicle motor system of claim 10, wherein the first electric machine is arranged coaxially with the second electric machine and wherein a stator of the first electric machine is at least partially circumferentially surrounded by the rotor of the second electric machine.

15. The electric vehicle motor system of claim 10, wherein the rotor of the second electric machine and the ring gear form a continuous structure.

16. The electric vehicle motor system of claim 10, further comprising a bearing coupled to the output shaft and a section of the carrier and wherein the output shaft is coupled to a drivetrain component.

17. The electric vehicle motor system of claim 10, wherein the first electric machine, the second electric machine, and the planetary gear set are enclosed within a housing assembly.

18. An electric vehicle motor system, comprising:
a first electric machine rotationally coupled to a second electric machine by a planetary gear set that includes a ring gear, a sun gear, and a carrier with a plurality of rotatable planetary gears, a recess formed into a rotor of the second electric machine circumferentially surrounding a portion of the first electric machine, the portion less than an entirety of the first electric machine, and wherein the ring gear, the sun gear, and the carrier with the plurality of rotatable planetary gears are positioned in the recess formed into the rotor of the second electric machine;
wherein the first electric machine varies in size from the second electric machine;
wherein the carrier is grounded;
wherein the ring gear is directly rotationally coupled to the second electric machine and is directly coupled to an output shaft; and
wherein the sun gear is directly rotationally coupled to the first electric machine.

19. The electric vehicle motor system of claim 18, further comprising a controller including instructions stored in non-transitory memory executable by a processor that cause the controller to:
vary speeds of the first and second electric machines based on one or more system operating conditions while maintaining the first electric machine at a higher speed than the second electric machine.

* * * * *